J. A. GREEN.
Grain Cleaner.

No. 112,334.

Patented Mar. 7, 1871.

Witnesses:
J. C. Brecht.
Edw. F. Brown.

Inventor:
James A. Green
By his Atty, J. F. Reigart

United States Patent Office.

JAMES A. GREEN, OF MILL DALE, VIRGINIA.

Letters Patent No. 112,334, dated March 7, 1871.

IMPROVEMENT IN GRAIN-CLEANERS AND FERTILIZER-SIFTERS.

The Schedule referred to in these Letters Patent and making part of the same.

*To all whom it may concern:*

Be it known that I, JAMES A. GREEN, of Mill Dale, Warren county, State of Virginia, have invented new and useful Improvements in Grain-Cleaners and Fertilizer-Sifters combined; and I do hereby declare the following to be an exact description thereof, reference being had to the accompanying drawing and to the letters of reference marked thereon making a part of this specification, in which—

Figure 1:
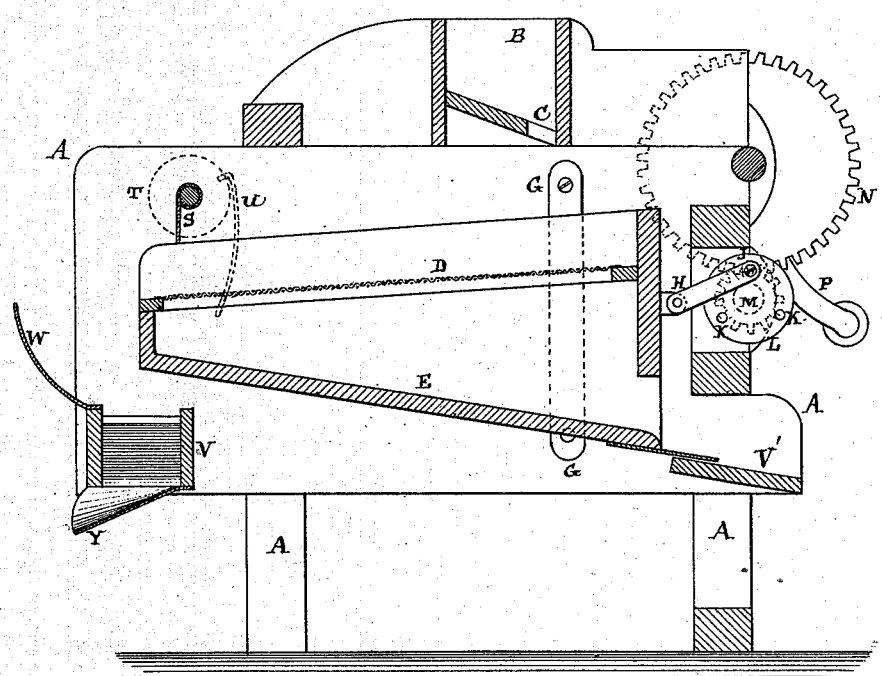

Figure 1 represents a side sectional elevation of the machine.

Figure 2:
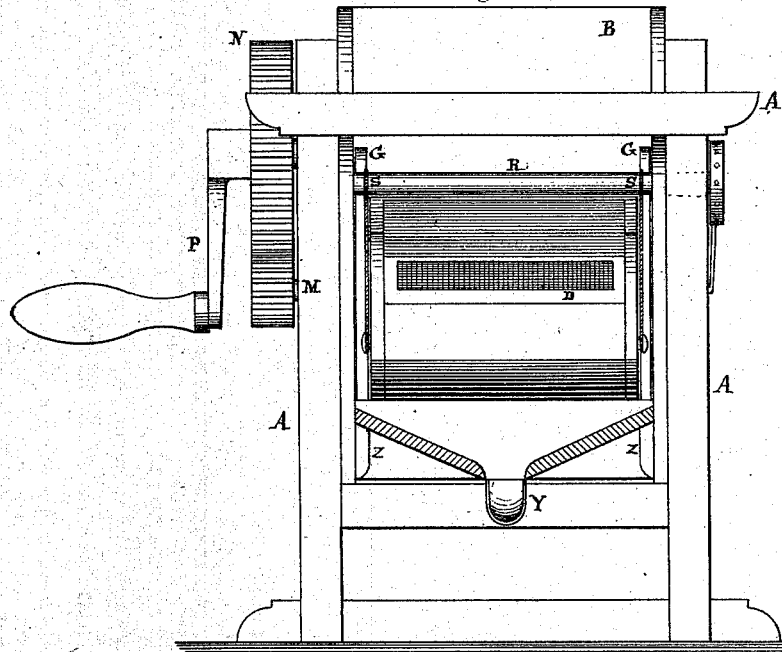

Figure 2, a rear view of the machine.

The nature of my invention consists in the arrangement and combination of the regulating-wheel in front and adjusting-wheel in the rear as attached to the screen or sifting-shoe, with the movable hopper in the rear, when constructed as herein described.

The object of my invention is to clean grain, and afterward sift gypsum, lime, or ashes, as fertilizers, in the same operating machine, by adjusting the shoe and removing the rear hopper.

To enable others skilled in the art to make and use my invention, I will proceed to describe it, as follows:

A represents the square frame of the machine that supports the operating devices.

B represents the angular hopper at the top of the machine with its aperture C, through which the grain or fertilizer is passed down and upon the screen D below.

E is the incline board or bottom of the shoe that carries the screenings of the grain or the sifted fertilizer to the front end of the machine, where they are discharged in a heap upon the floor.

G G are the vibrating arms that support the shoe, and are attached at their tops by pivots to the sides of the frame A, and their lower ends fastened by screws or pivots to the bottom or incline board E of the shoe.

To the front of the shoe is attached a pitman, H, that operates on a wrist or adjustable pin, J, that fits into apertures K of an eccentric-wheel, L, by which the shaking or vibrating movement is lengthened or shortened, as may be required, to give extra motion to the shoe when the fertilizer is being sifted. This regulating-wheel L revolves upon the one end of the pinion-shaft M, that is driven by the toothed-wheel N and its crank P.

Across the top and near the rear of the machine is an adjustable windlass, R, with two cords, S S, attached to each side of the shoe, the shaft or windlass having a wheel, T, with apertures on its periphery, into which the hooked catch, U, drops and locks the wheel when the cords are wound up or unwound, for the purpose of raising or lowering the sieve D at its rear end to the inclination or level required to be operated, and as adjusted for the sifting or cleaning operation.

At the rear and lower side of the machine is an angular hopper, V, with a curved sheet-iron dasher, W, against which the grain strikes and is prevented from falling beyond the hopper, while the grain is conducted down the incline sides of the hopper and discharged at the central spout Y.

This hopper is movable, and is only used for the discharge of the grain while being cleaned. It fits and rests upon two side strips Z Z on the inside of the frame A of the machine.

What I claim as my invention, and desire to secure by Letters Patent, is—

In the grain-cleaner and fertilizer-sifter herein described, the arrangement of the shifting shoe with the hopper V and spout V', eccentric L, adjusting-wheel T, and windlass R and cords S, when constructed and operating as shown, for the purpose set forth.

JAMES A. GREEN.

Witnesses:
J. FRANKLIN REIGART,
JAS. W. GREEN.